United States Patent
Gray et al.

(10) Patent No.: US 6,473,419 B1
(45) Date of Patent: Oct. 29, 2002

(54) STATE APPARATUS, AND ASSOCIATED METHODS, FOR CONTROLLING PACKET DATA COMMUNICATIONS IN A RADIO COMMUNICATION SYSTEM

(75) Inventors: Steven D. Gray, Dallas; Mark Cheng, Colleyville, both of TX (US); Janne Parantainen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/152,366

(22) Filed: Sep. 14, 1998

Related U.S. Application Data

(60) Provisional application No. 60/079,439, filed on Mar. 26, 1998.

(51) Int. Cl.$^7$ ............................... H04J 7/24; H04J 1/16
(52) U.S. Cl. ...................... 370/349; 370/252; 455/522
(58) Field of Search ................................. 370/328, 332, 370/333, 335, 338, 342, 349, 508, 410, 519, 389, 392, 320, 252; 455/450, 522, 466, 509

(56) References Cited

U.S. PATENT DOCUMENTS

| | | | |
|---|---|---|---|
| 5,708,656 A | * | 1/1998 | Noneman et al. ........... 370/335 |
| 5,757,772 A | * | 5/1998 | Thornberg et al. .......... 370/236 |
| 5,903,558 A | * | 5/1999 | Jones et al. ................. 370/230 |
| 6,216,006 B1 | * | 4/2001 | Scholefield et al. ........ 455/422 |
| 6,249,681 B1 | * | 6/2001 | Virtanen ...................... 370/349 |
| 6,286,122 B1 | * | 9/2001 | Alanara ....................... 370/329 |

* cited by examiner

*Primary Examiner*—Chau Nguyen
*Assistant Examiner*—Chi ho A Lee
(74) *Attorney, Agent, or Firm*—Federico Fraccaroli

(57) ABSTRACT

State apparatus, and an associated method, controls a packet data service in a radio communication system in which a mobile station is operable. Control architecture is represented by operational states in which the mobile station is caused to be operated includes a control hold power save substate and a virtual traffic substate. Subsequent to a selected period of communication inactivity, the operational state of the mobile station in caused to be transitioned into a control hold power save substate in which a dedicated control channel remains allocated to the mobile station. If packet data is subsequently to be communicated by the mobile station, the channel is readily available to the mobile station to communicate the packet data thereon. When, conversely, subsequent to a period of communication inactivity, operation of the mobile station is caused to be transitioned into the virtual traffic channel substate, a communication channel is released from its allocation to the mobile station.

19 Claims, 5 Drawing Sheets

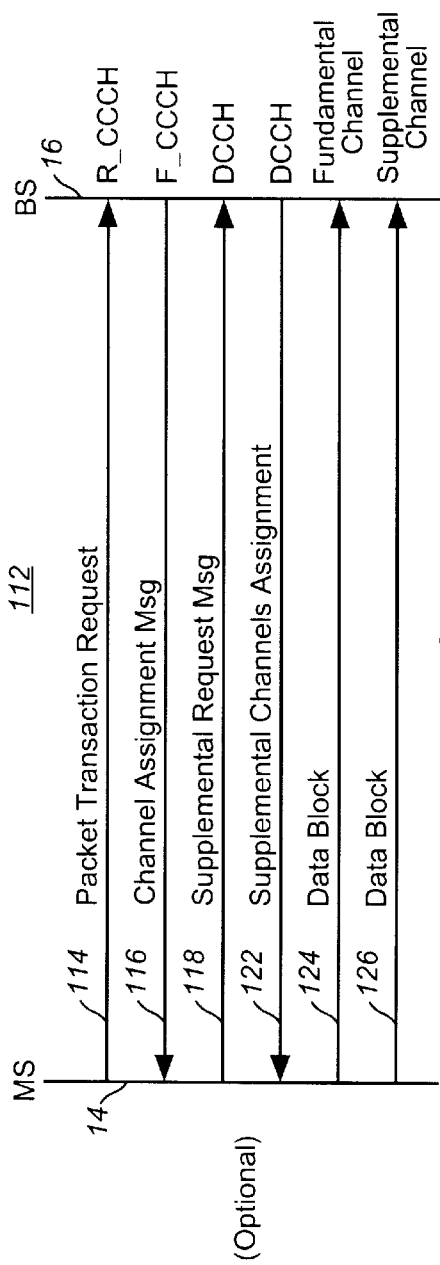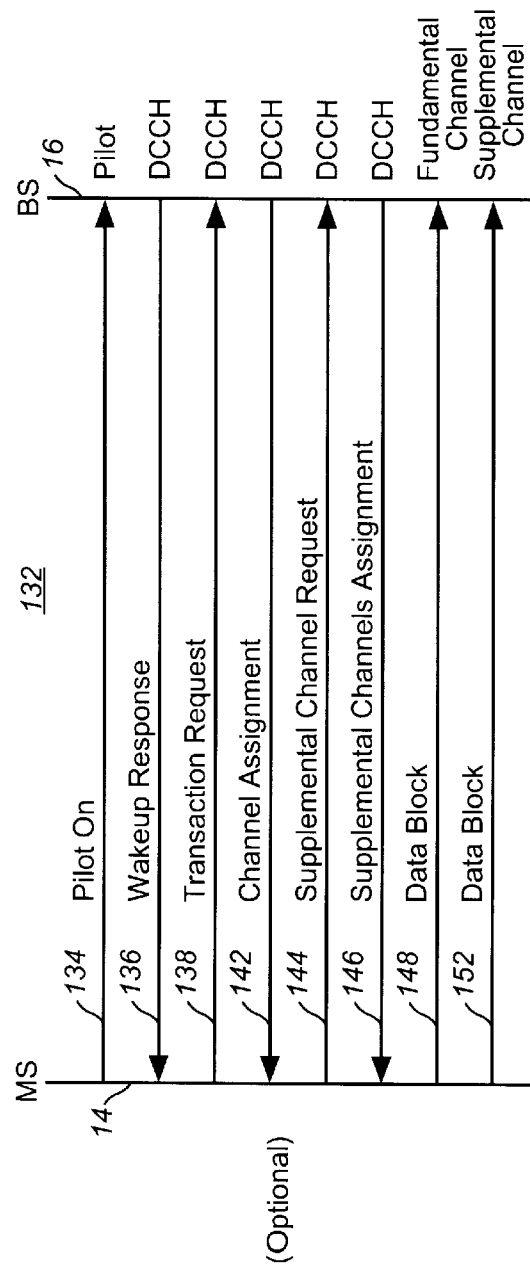

STATE APPARATUS, AND ASSOCIATED METHODS, FOR CONTROLLING PACKET DATA COMMUNICATIONS IN A RADIO COMMUNICATION SYSTEM

CROSS REFERENCE TO RELATED APPLICATIONS

The present application claims the priority of provisional patent application No. 60/079,439, filed on Mar. 26, 1998, the contents of which are incorporated herein by reference.

The present invention relates generally to the allocation of resources in a communication system in which packet data is communicated between a sending station and a receiving station. More particularly, the present invention relates to apparatus, and an associated method, for allocating communication channels for packet data communications with a mobile station in a multi-user, radio communication system, such as a cellular communication system which provides for packet data communications.

A QoS (quality of service) parameter is associated with a packet service-type, such as a packet-voice communications service or a packet-video communications service. The QoS parameter defines allowable access-delay times for access to communication channels to communicate packet data pursuant to the communications service thereon. State machine apparatus is used to assign operational states pursuant to which a data service is to be operated. The operational states or substate, in which the data service is caused to be operated is dependent upon the QoS parameter of the service. The amount of system resources allocated to the data service pursuant to the operational state in which a mobile station used to effectuate the data service is operated is dependent upon the QoS parameter. If the QoS parameter is of at least a selected value, the mobile station is operated in a state in which a channel remains allocated to the mobile station for packet data communications even subsequent to a period of communication inactivity by the mobile station. By continuing to allocate the channel to the mobile station, little or no access delay times occur when additional packet data is to be communicated.

In one implementation, an embodiment of the present invention is utilized in a CDMA (code-division, multiple-access) mobile communication system, such as that constructed pursuant to the IS-95 interim standard promulgated by the EIA/TIA. Packet data users are managed by way of a network control architecture having multiple states. State transitions are dependent upon the QoS parameter of the packet service-type of the communications to be effectuated. The value of the QoS parameter is determinative to which state a state transition is made. And, the state in which the mobile station, used to effectuate the data service, is operated is determinative of the level of resources allocated to the mobile station and, correspondingly, the access delay times within which a channel is made available for the communication of packet data thereon.

BACKGROUND OF THE INVENTION

Advancements in digital telephony techniques have permitted the development, implementation, and widespread usage of multi-user, digital communication systems. Use of digital techniques is advantageous, inter alia, as the communication capacity of a digital communication system is typically greater than the capacity of a corresponding analog system. Error correction of signals transmitted during operation of such a system can also be improved.

A cellular communication system is exemplary of a communication system which has been made possible as a result of such advancements. A cellular communication system permits communications to be effectuated with a mobile station by way of a radio channel, thereby obviating the need for a wire line connection to form a communication channel between a sending and a receiving station. Through use of a cellular communication system, communications are possible at locations at which the use of fixed or hard-wired connections would be inconvenient or impractical, such as in a motor vehicle. Cellular communication systems have been implemented using various communication schemes. A CDMA (code-division, multiple-access) cellular communication system is an exemplary communication system, implemented utilizing code-division techniques.

Some cellular communication systems provide for the transmission of packet data to and from a mobile station. Information which is to be transmitted is formatted into discrete packets of data, and the packets are transmitted upon a communication channel. In a CDMA (code-division, multiple-access) communication scheme, for instance, a packet channel is assigned by allocation of a code, by which to encode packets of data which are to be transmitted by a transmitting station and to decode the packets, once received at a receiving station.

A dedicated channel, allocated to a user to communicate packet data thereon ensures ready access to the communication channel to communicate packet data thereon. As such ready access to the traffic channel necessitates allocation of the communication resources of the communication system, perhaps to the exclusion of other users, providing such ready access to a particular user is relatively resource consumptive.

Some packet data services are time-sensitive, while others are relatively time-insensitive. Packet-voice and packet-video services, e.g., are time-sensitive communication services. Ready access to the traffic channel upon which packet data is to be communicated is necessary to ensure timely delivery of the time-sensitive information. TCP/IP communications, such as those utilized for web-browsing communications, are, conversely, relatively time-insensitive. Internet system resources need not be allocated in a manner which dedicates a channel to effectuate such communications. Allocation of a channel on an as-needed basis is adequate to effectuate such communications.

A communication system which selectively provides for ready access to communicate packet data by ensuring allocation of a dedicated channel for its communication, depending upon the packet service-type would therefore be advantageous.

It is in light of this background information related to packet data communications, and communication systems permitting the communication of packet data, that the significant improvements of the present invention have evolved.

SUMMARY OF THE INVENTION

The present invention, accordingly, advantageously provides apparatus, and an associated method, for allocating communication channels for packet data communications with a mobile station in a multi-user, radio communication system.

One or more packet service-types are provided by the communication system. A QoS (quality of service) parameter is associated with each of the packet data service-types. The QoS parameter defines allowable access-delay times for access to communication channels to communicate packet data pursuant to the data service type thereon. System resources are allocated responsive to the QoS parameter of the service subscription. If the service subscription provides a QoS parameter calling for ready access to a communication channel upon which to communicate the packet data, the communication channel is allocated to a mobile station, even during periods of communication inactivity. If, conversely, the QoS parameter of the service subscription does not call for ready access to the communication channel to communicate packet data thereon, during periods of communication inactivity, a communication channel is not caused to remain allocated to the mobile station.

State machine apparatus define operational states in which a data service is caused to be operated. Responsive to communication activity of a mobile station used to effectuate the data service and the QoS parameter of the service subscription, the mobile station is caused to be translated into other operational states and appropriate levels of system resources are caused to be allocated thereto.

An embodiment of the present invention forms a portion of a CDMA (code-division, multiple-access), cellular communication system, such as that constructed in compliance with the IS-95 interim standard, or a successor, promulgated by the EIA/TIA. Mobile stations operable in such a communication system are managed by way of a network control architecture having multiple numbers of states. State transitions are dependent upon communication activity of the mobile stations as well as the QoS parameters of the packet data service-types pursuant to which communications are to be effectuated.

In these and other aspects, therefore, apparatus, and an associated method, controls operational states of a data service in which, e.g., a mobile station is operable to effectuate the data service. The data service is operable in a communication system having network infrastructure between which the mobile station is selectively permitted to communicate packet data pursuant to at least one packet service-type by way of a communication channel. A QoS (quality of service) parameter is associated with each packet service-type. The QoS parameter defines a communication channel access-time delay-period within which access to the communication channel is to be provided to effectuate the packet data communications. The data service is selectively operable in an active state when packet data is to be communicated between the mobile station and the network infrastructure. A dedicated traffic channel is assigned to form the communication channel to communicate the packet data thereon when the mobile station is operated in the active state. Operation of the data service after a period of inactivity elapses during which a dedicated channel is maintained is transitioned into a control hold state from the active state responsive to a first selected period of communication inactivity. Operation of the data service is transitioned into a virtual traffic substate from the control hold state when the QoS parameter associated with the packet data service-type is beyond a selected level and the dedicated traffic channel and control channel are released from assignment to form the communication channel. In a further embodiment, when the QoS parameter is within the selected level, the dedicated traffic channel remains assigned to form the communication channel.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 5 illustrates a sequence diagram illustrating signal sequencing which occurs during operation of an embodiment of the present invention.

FIG. 6 illustrates another sequence diagram also showing signal sequencing which occurs during operation of an embodiment of the present invention.

DETAILED DESCRIPTION

Figure 1:
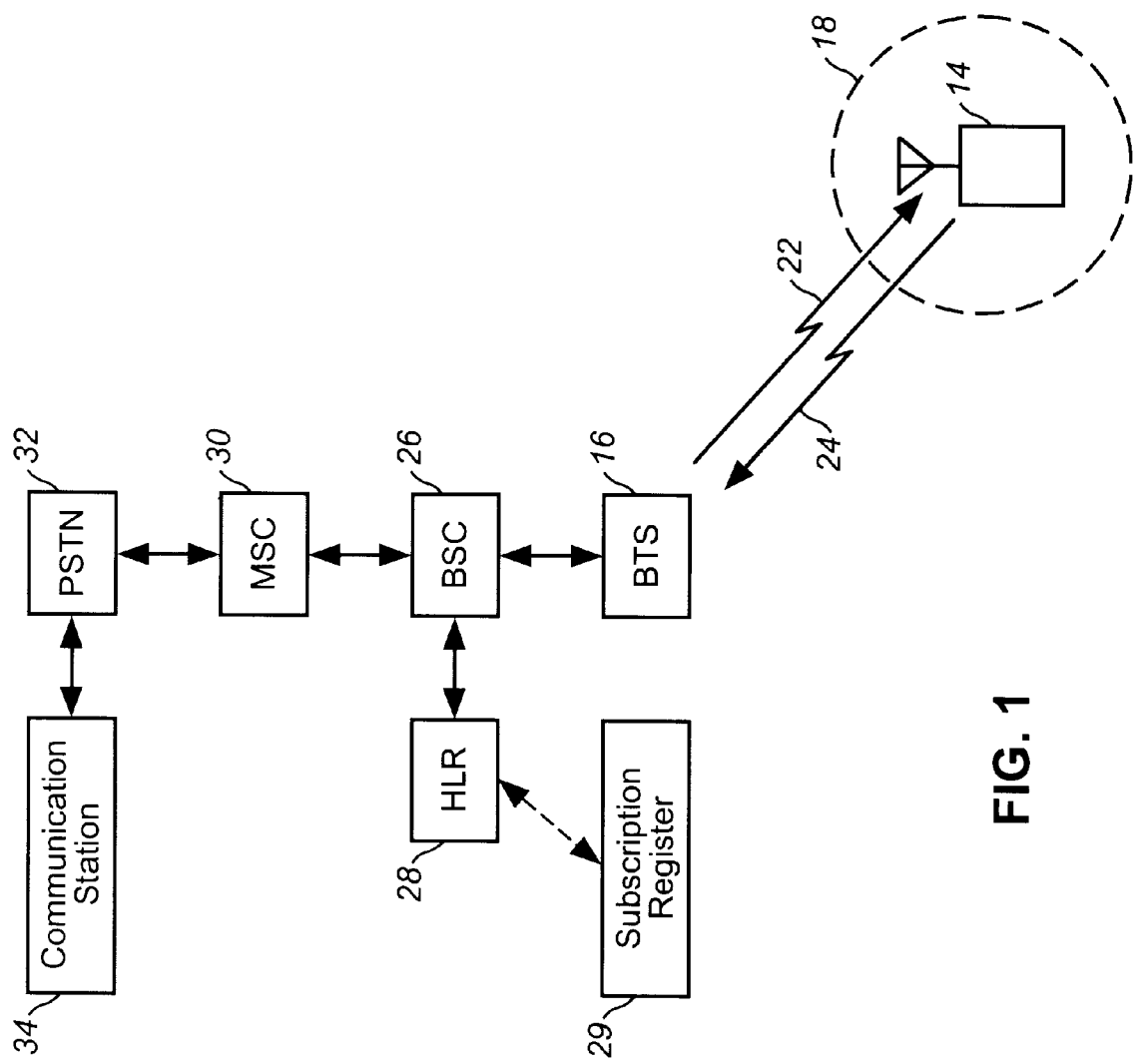
FIG. 1 illustrates a functional block diagram of an exemplary cellular communication system in which an embodiment of the present invention is operable.

Referring first to FIG. 1, a portion of an exemplary, cellular communication system, shown generally at 10, permits two-way, wireless communication with a mobile station 14. While, for purposes of illustration, only a single mobile station 14 is illustrated in the Figure, in an actual cellular communication system, a plurality of mobile stations are permitted to communicate concurrently to form a multi-user communication system. The communication system 10 is exemplary of a cellular communication system constructed pursuant to the specification proposed for the IS-95 3G interim standard; the communication system 10 is analogously representative of other radio communication systems capable of communicating packet data.

The communication system 10 includes network infrastructure, of which a portion is illustrated in the Figure. The infrastructure includes a plurality of BSCs (base station controllers) of which the BSC 16 is representative. The BSC 16 defines a cell 18 forming a coverage area in which down link communications 22 and reverse-link communications 24 are permitted with the mobile station 14 by way of a radio air interface.

The BSC 16 is coupled to a MSC (mobile switching center) 26, and the MSC 26 is, in turn, coupled to a BSC (base station controller) 28. The BSC 28 is coupled to a PSTN (public-switched telephonic network) 32, thereby to permit communication between the mobile station 14 and a communication station, such as the station 34 coupled to the PSTN 32.

Packet data originated at, or to be terminated at, the mobile station 14 pursuant to a particular packet data service-type is transmitted upon a 25 dedicated communication channel to permit the communication of packet data to and from the mobile station 14. System resources, e.g., the codes assigned in a CDMA system which define a dedicated channel, are limited. That is to say, the number of dedicated channels available to form radio links between mobile stations, such as the mobile station 14 and the network infrastructure is limited. Dedicated channels allocated for point-to-point, or other, communications with a large number of mobile stations might be of a number which prevents additional communications to be effectuated with additional mobile stations upon other dedicated channels. Subsequent at least to a period of communication inactivity by a mobile station, a channel assigned for such communication is typically reallocated to permit the effectuation of communications with other mobile stations.

When a communication channel is released from its allocation to a particular mobile station, there might be an access-delay time subsequent to a request by the mobile station to communicate additional packet data over the radio air interface. Such an access-time delay might be inappropriate if the communication of the packet data is time-sensitive.

If the communication channel were, however, to remain allocated to a mobile station even subsequent to periods of communication inactivity, there would be no access delay time necessitated to reallocate the channel to the mobile station when packet data subsequently is to be communicated between the mobile station and the network infrastructure. A QoS (quality of service) parameter representative of allowable access delay times in accessing a communication channel to effectuate the communication of packet data could be used to determine the allocation of resources to the mobile station in the communication system. The QoS parameter could form a portion of the subscription information associated with a packet data service-type stored at the subscription register 29 of the HLR 28. Such a scheme would permit improved levels of channel allocations to particular mobile stations based upon the value of the QoS parameter of the service subscription pursuant to which the mobile station is operable.

Figure 2:
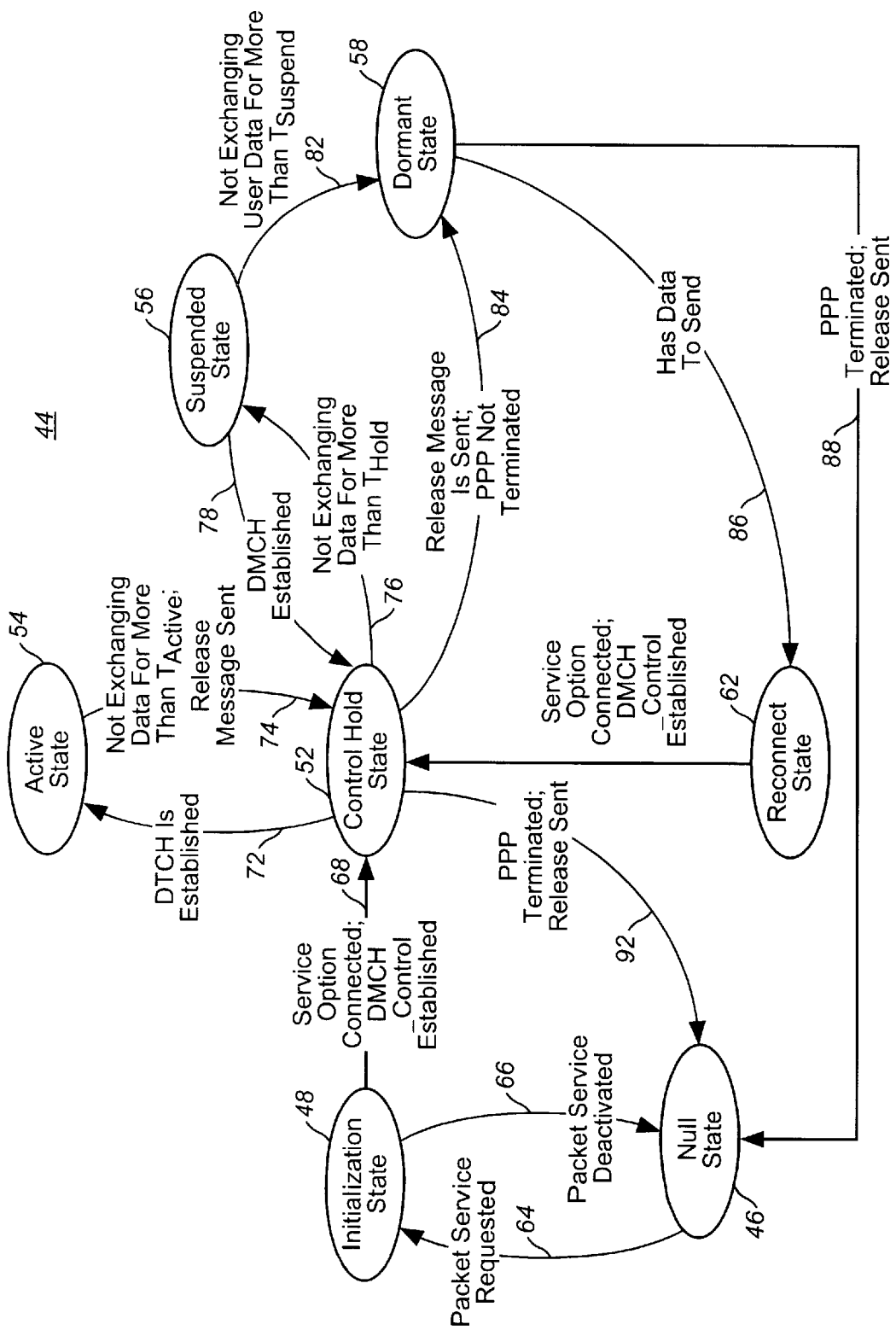
FIG. 2 illustrates a state diagram of control architecture of which an embodiment of the present invention forms a portion.

FIG. 2 illustrates control architecture, shown generally at 44, which is represented by a state diagram. The control architecture 44 is representative of the MAC (medium access control) layer proposed for the IS-95 3G specification for providing packet data services for the communication of packet data originated at, or terminated at, a mobile station, such as the mobile station 14 shown in FIG. 1. The control architecture 44 is implemented at the network infrastructure, e.g., at a base station, such as the BTS 16 (shown in FIG. 1). The state diagram forming the control architecture 44 includes a plurality of states, here including a packet null state 46, an initialization state 48, a control hold state 52, an active state 54, a suspended state 56, and a dormant state 58.

Each of the states 46–58 define operational states in which a mobile station is operated with respect to packet services. The particular state in which the mobile station is operated is determinative of the level of connection in the packet service. When operated in the various ones of the operational states, different portions of the protocol stack of the control architecture are connected. For instance, a fully-connected mobile station is operated in the active state 54 whereat a PPP, a MAC layer, and physical layer connections are formed between the mobile station and the network infrastructure.

The state diagram representing the control architecture 44 further illustrates the state transitions between the various states 46–62. For instance, a transition, indicated by the line 64, is made between the packet null state 46 and the initialization state 48 when packet service is requested. And, a transition, indicated by the line 66 from the initialization state back to the packet null state occurs when packet service is deactivated. And, a transition, indicated by the line 68, occurs from the initialization state 48 to the control hold state 52 when a service option is connected. When a transition is made, a dedicated signaling channel (DSCH) and a dedicated MAC channel (DMCH) are established.

A transition, indicated by the line 72 from the control hold state 52 to the active state 54 occurs when a dedicated traffic channel is established upon which to communicate packet data between the network infrastructure and the mobile station. A transition, indicated by the line 74 from the active state 54 back to the control hold state 52 occurs when a determination is made that data has not been exchanged from one and a selected time, here $T_{active}$.

A transition, indicated by the line 76 from the control hold state 52 to the suspended state 56 occurs when a determination is made of the absence of exchange of data for at least an additional, selected time period, here $T_{hold}$. When the transition is made, the DSCH and DMCH are released. A transition, indicated by the line 78 from the suspended state 56 back to the control hold state occurs when the dedicated MAC channel and the dedicated signaling channel are established. And, a transition, indicated by the line 82 from the suspended state 56 to the dormant state 58 occurs when a determination is made that user data is not exchanged for more than another time period, here indicated by $T_{suspend}$. A transition, indicated by the line 84 from the control hold state 52 to the dormant state 58 occurs when a release message transmission is sent between the mobile station and the network infrastructure, but PPP communications are not terminated.

A transition, indicated by the line 86 occurs from the dormant state 58 to the reconnect state 62 when determination is made that packet data is to be communicated between the mobile station and the network infrastructure. And, a transition, indicated by the line 88 from the dormant state 58 to the packet null state 46 occurs when the point-to-point communications are terminated and a release message indicative of such is transmitted. A transition, indicated by the line 92, from the control hold state 52 to the packet null state 46 also occurs when such a termination is made when the mobile station is operated in the control hold stage rather than the dormant state.

The operational states of the state diagram representing the control architecture 44 are categorized in two groups, depending upon the status of the packet service option, vis., the states are either "connected" states or "disconnected" states from a service option standpoint. The control hold states 52, the active state 54, and the suspended state 56 are all connected states. And, the remaining states, i.e., the packet null state 46, the initialization state 48, the dormant state 58, and the reconnect state 62 are all disconnected states.

By introducing a QoS parameter relating to allowable access-time delay period within which access to a communication channel must be provided to effectuate communication pursuant to a particular packet data service-type, the control architecture 44 can be modified to provide service responsive to the QoS parameter.

Figure 3:
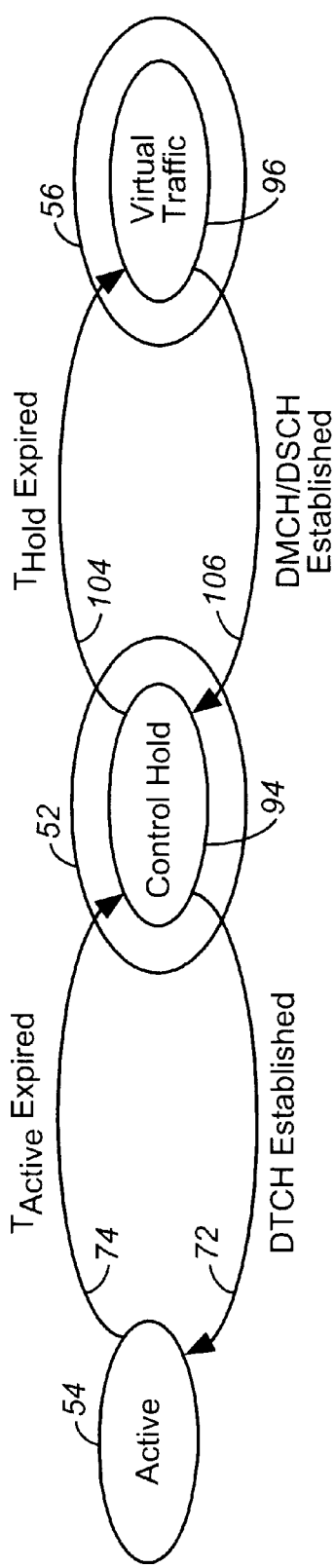
FIG. 3 illustrates a state diagram of a portion of the control architecture of an embodiment of the present invention.

FIG. 3 illustrates a portion of the control architecture 44, shown in FIG. 2. Namely, the control hold state 52, the active state 54, and the suspended state 56 are again shown. And, the transitions indicated by the lines 72 and 74 from the control hold state 52 to the active state 54 and from the active state 54 back to the control hold state 52 respectively also are again shown. FIG. 3 further illustrates a control hold normal substate 94 and a virtual traffic substate 96. As shown, the control hold normal substate 94 is a substate of the control hold state 52, and the virtual traffic substate is a substate of the suspended state 56. Here, a transition from the control hold state 52, or, more particularly, from the substate 94, to the virtual traffic substate 96 occurs when the mobile station is operated in the control hold state, but there is a period of communication inactivity corresponding to the time period $T_{hold}$. When the mobile station is operated in the control hold state, an extended assignment of dedicated channel resources is required. Such assignation increases the probability that the channel assignment might block the allocation of a channel to another mobile station. In an embodiment of the present invention, if the bulk delay requirement of the QoS parameter are greater than a selected threshold, $t_{delay}$, then once a data buffer of a mobile station is emptied, a transition from the control hold state 52 to the virtual traffic substate occurs. If communication inactivity continues, a transition from the virtual traffic substate to the suspended state 56 (shown in FIG. 2) occurs, as indicated by the line 76. Such continued period of communication inactivity is timed, e.g., by a virtual traffic timer.

Figure 4:
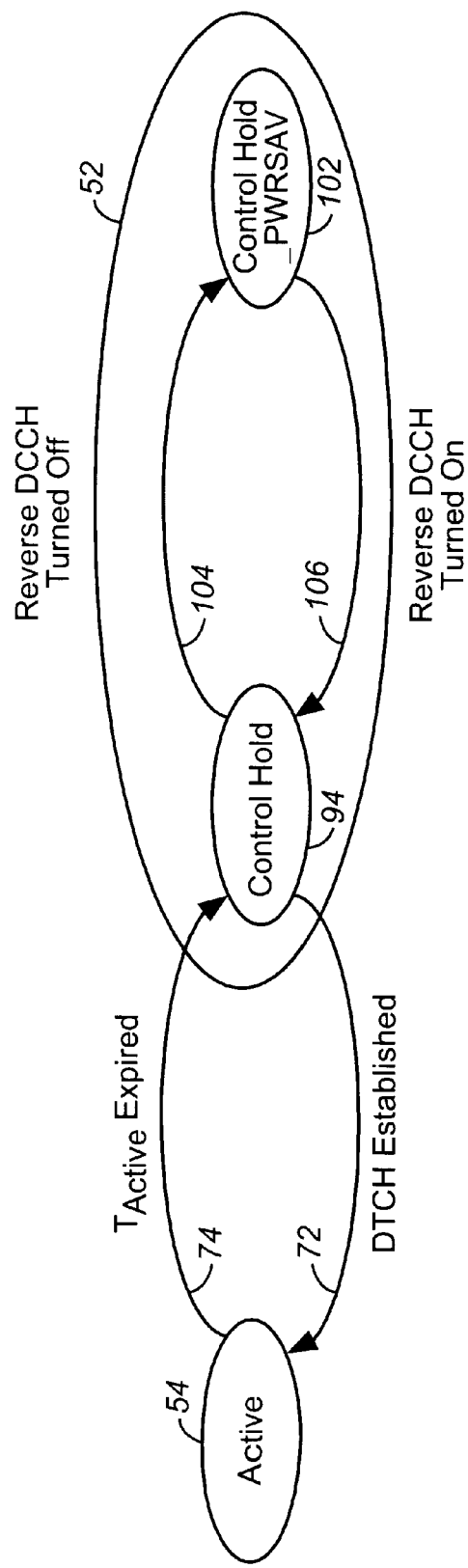
FIG. 4 illustrates another state diagram which also forms a portion of the control architecture of an embodiment of the present invention.

FIG. 4 also illustrates a portion of the control architecture 44 shown previously in FIG. 2. Namely, the control hold state 52 and the active state 54 are again shown. And, the transitions, indicated by the lines 72 and 74 are also again shown. Here, the control architecture is modified to include a control hold power save substate 102 in addition to the control hold normal substate 94. Operation of a mobile station is transitioned from the control hold normal substate 94 to the control hold power save substate 102 for delay-sensitive communication applications. When the QoS parameter calls for ready access to a dedicated traffic channel. To ensure such ready access to the communication channel, the air interface resource must be maintained. That is to say, allocation of the dedicated traffic channel to the mobile station must be maintained. So, a transition is not made to the virtual traffic substate 96 (shown in FIG. 3). Continuous transmission on the reverse-link, dedicated control channel (DCCH) is not required so, when a transition, indicated by the line 104, from the control hold normal substate 94 to the control hold power save substate 102 occurs, the reverse DCCH is turned-off. When packet data is to be communicated upon the dedicated traffic channel and the mobile station is operated in the control hold power save substate, a transition, indicated by the line 106, is made. The dedicated control channel is maintained in a mode where the mobile station transmits and receives discontinuously (i.e., the radio frequency transmitter is turned on and off). Because the dedicated control channel is maintained, signaling required to obtain a dedicated traffic channel is minimal.

FIG. 5 illustrates a sequence diagram 112 representing the signaling procedures between the mobile station 14 (shown in FIG. 1) and the BTS 16 (also shown in FIG. 1) when the mobile station is operated in the virtual traffic substate (shown in FIG. 3) when a channel is to be accessed by the mobile station. First, and as indicated by the segment 114, the mobile station transmits a packet transaction request on the reverse control channel to the base station 16. The BTS 16 responds, as indicated by the segment 116 with a channel assignment message on a forward control channel. An optional, supplemental request message is returned, indicated by the segment 118 on a reverse-link dedicated control channel to the BTS 16, and, responsive thereto, a supplemental channel assignment is provided by the BTS 16 on the dedicated control channel to the mobile station 14.

Thereafter, and as indicated by the segments 124 and 126, data blocks formed of packet data are transmitted by the mobile station 14 and, if appropriate, also on a supplemental channel, to the BTS 16. As the packet transaction request, indicated by the segment 114 goes through a random access procedure, the delay in allocation of a channel to the mobile station upon which to transmit the data might be increased, depending upon the system load at the time the packet transaction request is generated.

FIG. 6 illustrates a sequence diagram 132 representing the signaling procedures of a mobile station when the mobile station is operated in the control hold power save substate 102 (shown in FIG. 4) when the mobile station is to access a dedicated channel. As noted above, when the mobile station is operated in the control hold power save substate, transmission on the reverse-link dedicated control channel is discontinuous.

First, and as indicated by the segment 132, a pilot-on signal is transmitted to the BTS 16. Responsive thereto, the base station 16 returns a wake-up response on the dedicated control channel to the mobile station. Thereafter, the mobile station generates a transaction request, indicated by the segment 138 on the reverse-link dedicated control channel, and the BTS 16 responds with a channel assignment on the dedicated control channel indicated by the segment 142. Optionally, a supplemental channel request, indicated by the segment 144 and a supplemental channel assignment, indicated by the segment 146, responsive thereto is provided to the mobile station.

Thereafter, and as indicated by the segment 148, a data block formed of packet data is generated by the mobile station on the fundamental channel assigned to the mobile station. And, if a supplemental channel assignment is given to the mobile station, additional data blocks are transmitted, indicated by the segment 152, on the supplementally-assigned channel. Because the transaction request, indicated by the segment 138, is transmitted upon a dedicated control channel without the need also first to transmit a packet transaction request pursuant to a random access procedure, delay access times are significantly reduced.

Figure 7:
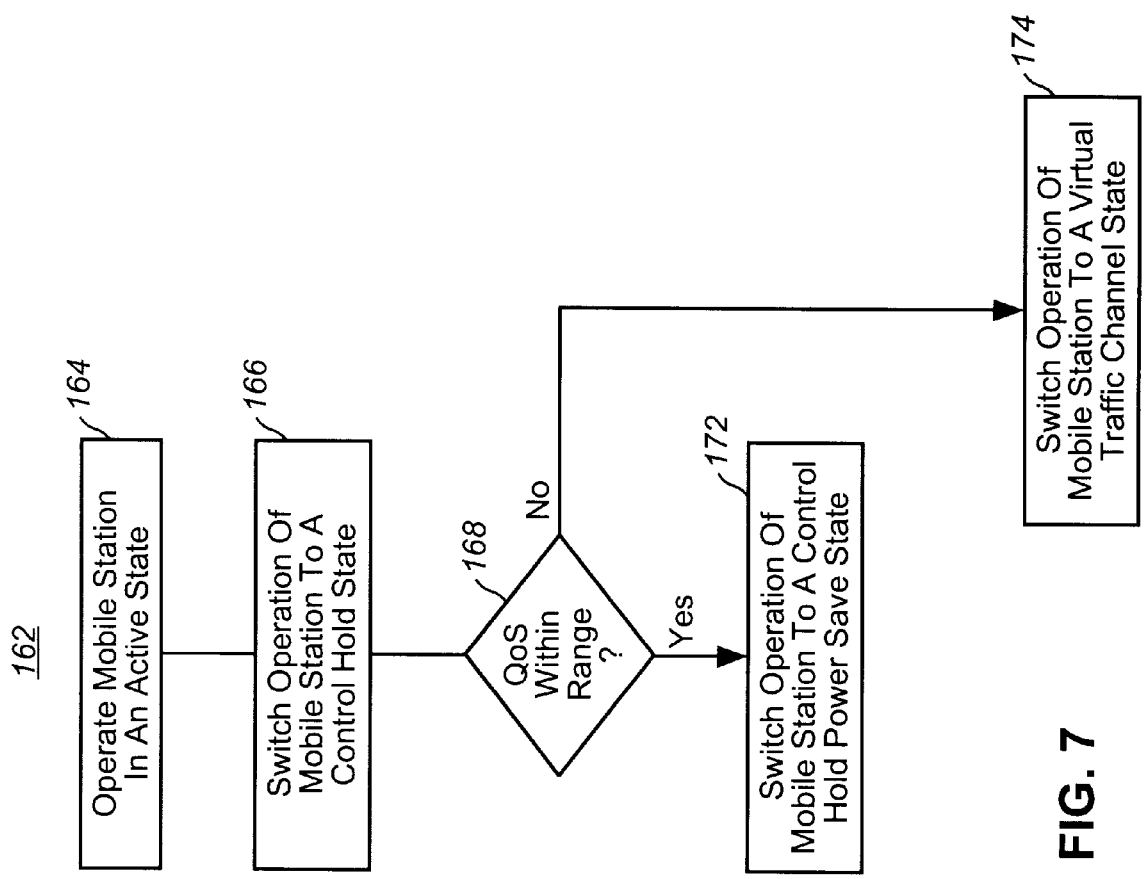
FIG. 7 illustrates a method flow diagram listing the method steps of the method of operation of an embodiment of the present invention.

FIG. 7 illustrates a method, shown generally at 162, of an embodiment of the present invention. The method controls a packet data service for a mobile station operating in a telecommunications system.

First, and as indicated by the block 164, the mobile station is operated in an active state. Then, and as indicated by the block 166, the mobile station is switched to a control hold state.

A determination is made, as indicated by the decision block 168, whether the packet data service has a quality of service requirement within a predetermined range. If so, the yes branch is taken to the block 172, and the mobile station is switched to a control hold power save substate. Otherwise, the no branch is taken from the decision block 168 to the block 174, and the mobile station is switched to a virtual traffic substate.

A manner is thereby provided by which to ensure that a channel remains allocated to a mobile station to communicate packet data thereon even subsequent to a period of communication inactivity, if a QoS parameter associated with a packet data service-type is of a selected value. Greater assurances are thereby provided that time sensitive data shall be timely communicated.

The previous descriptions are of preferred examples for implementing the invention and, the scope of the invention should not necessarily be limited by this description. The scope of the present invention is defined by the following claims.

We claim:

1. A method of controlling a packet data service for a mobile station operating in a telecommunications system, said method comprising the steps of:

operating the packet data service in an active state;

switching the packet data service to a control hold state;

determining whether or not the packet data service has a quality of service requirement within a predetermined range;

and, in response to a positive determination, switching the packet data service to a control hold power save substate;

else, if it is determined that said quality of service requirement is not less than a predetermined value, switching the packet data service to a virtual traffic substate.

2. The method of claim 1, wherein step of switching the packet data service to a control hold power save substate comprises discontinuously transmitting on a reverse dedicated control channel from the mobile station the system.

3. The method of claim 1, wherein said quality of service requirement comprises a threshold delay to returning said packet data service to said active state.

4. The method of claim 3, wherein said step of determining comprises determining whether or not said threshold delay is less than a predetermined value.

5. The method of claim 1, wherein said step of switching the packet data service to a control hold state comprises releasing a dedicated traffic channel.

6. The method of claim 5 wherein said step of switching the mobile station to a virtual traffic substate comprises releasing a dedicated control channel.

7. In a method of communicating packet data in a communication system having network infrastructure and a mobile station between which packet data communications pursuant to at least one packet service-type are selectively permitted by way of a communication channel, a QoS (quality of service) parameter associated with each of the at least one packet service-type, the QoS parameter defining a communication channel access-time delay-period within which access to the communication channel is to be provided to effectuate the packet data communications, an improvement of a method for operating the mobile station, said method comprising:

operating the mobile station in an active state when packet data is to be communicated between the mobile station and the network infrastructure, a dedicated traffic channel assigned to form the communication channel to communicate the packet data thereon when the mobile station is operated in the active state;

transitioning operation of the mobile station from the active state into a control hold state responsive to a first selected period of communication inactivity;

a transitioning operation of the mobile station from said control hold state into a virtual traffic substate when the QoS parameter associated with the packet data service-type is beyond a selected level, the dedicated traffic channel releasable out of assignment to form the communication channel subsequent to transition of operation of the mobile station into the virtual traffic substate; and transitioning operation of the mobile station from the control hold state into a control-hold power save substate when the QoS parameter associated with the mobile station is within the selected level.

8. The method of claim 7 further comprising the operation of a suspended transitioning operation of the mobile station from the virtual traffic substate into a suspended state responsive to a second selected period of communication inactivity.

9. The method of claim 8 further comprising the operation, responsive to transitioning of operation of the mobile station into the virtual traffic state, of timing a timing period corresponding to the second selected period, that corresponds to operation of the mobile station transitioning to the suspended state subsequent to timing-out of said virtual-traffic timer.

10. The method of claim 8 wherein the suspended state comprises a slotted suspended state.

11. The method of claim 7 wherein, when the mobile station is in the active state, a reverse-link dedicated control channel is further assigned to form the communication channel between the mobile station and the network infrastructure.

12. The method of claim 11 wherein, when the mobile station is operated in the control-hold power save substate, the reverse-link dedicated control channel is operated in a discontinuous transmission mode.

13. The method of claim 7 wherein, when the mobile station is operated in said control hold state, the dedicated control channel remains assigned to form the communication channel between the mobile station and the network infrastructure.

14. The method of claim 7 further comprising the operation of timing an activity timer responsive to operation of the mobile station in the active mode, the activity timer resettable during communication of packet data on the dedicated traffic channel, the activity timer for timing a timing period corresponding to the first selected period of communication inactivity, operation of the mobile station transitioning to said control hold state subsequent to timing-out of said activity timer.

15. The method of claim 7 wherein the communication system comprises a CDMA-cellular communication system, wherein the network infrastructure comprises a cellular base station, and wherein said steps of transitioning are performed at the cellular base station.

16. A method for operating a mobile station in a selected operational state, the mobile station forming a portion of a communication system and selectively permitted to communicate packet data pursuant to at least one packet service-type with network infrastructure of the communication system, a QoS (quality of service) parameter associated with each of the at least one packet service-type, the QoS parameter defining a communication channel access-time delay period within which access to the commuciation channel is to be provided to effectuate the packet data communications, said method comprising:

transitioning operation of the mobile station into an active state when the packet data it to be communicated between the mobile station and the network infrastructure, a dedicated traffic channel assigned to form the communication channel to communicate the packet data thereon when the mobile station is operated in the active state;

transitioning operation of the mobile station into a control hold state from the active state responsive to a first selected period of communication inactivity; and transitioning operation of the mobile station into a virtual traffic substate from the control hold state when the QoS parameter associated with the packet data service-type is beyond a selected level, the dedicated control channel released from assignment to form the communication channel.

17. The method of claim 16 comprising the additional operation, alternate to said operation of transitioning operation of the mobile station into the substate virtual traffic substate, of transitioning operation of the mobile station to a control-hold power-save substate within the control hold state when the QoS parameter associated with the packet data service-type is within the selected level.

18. The method of claim 17 comprising the additional operation, subsequent to said operation of transitioning operation of the mobile station into the virtual traffic-substate, when the mobile station is to access the communication channel, of transitioning operation of the mobile station back to the control hold state, and, thereafter back to the active state.

19. The method of claim 17 comprising the additional operation, subsequent to said operation of transitioning operation of the mobile station into the virtual traffic substate, when the mobile station is to access the communication channel, of transitioning operation of the mobile station back to the control hold state and, thereafter, back to the active state.

* * * * *